May 28, 1957
C. W. VOGT
2,793,694
TAPE CUTTING HEAD AND HOLDER
Filed Dec. 23, 1953
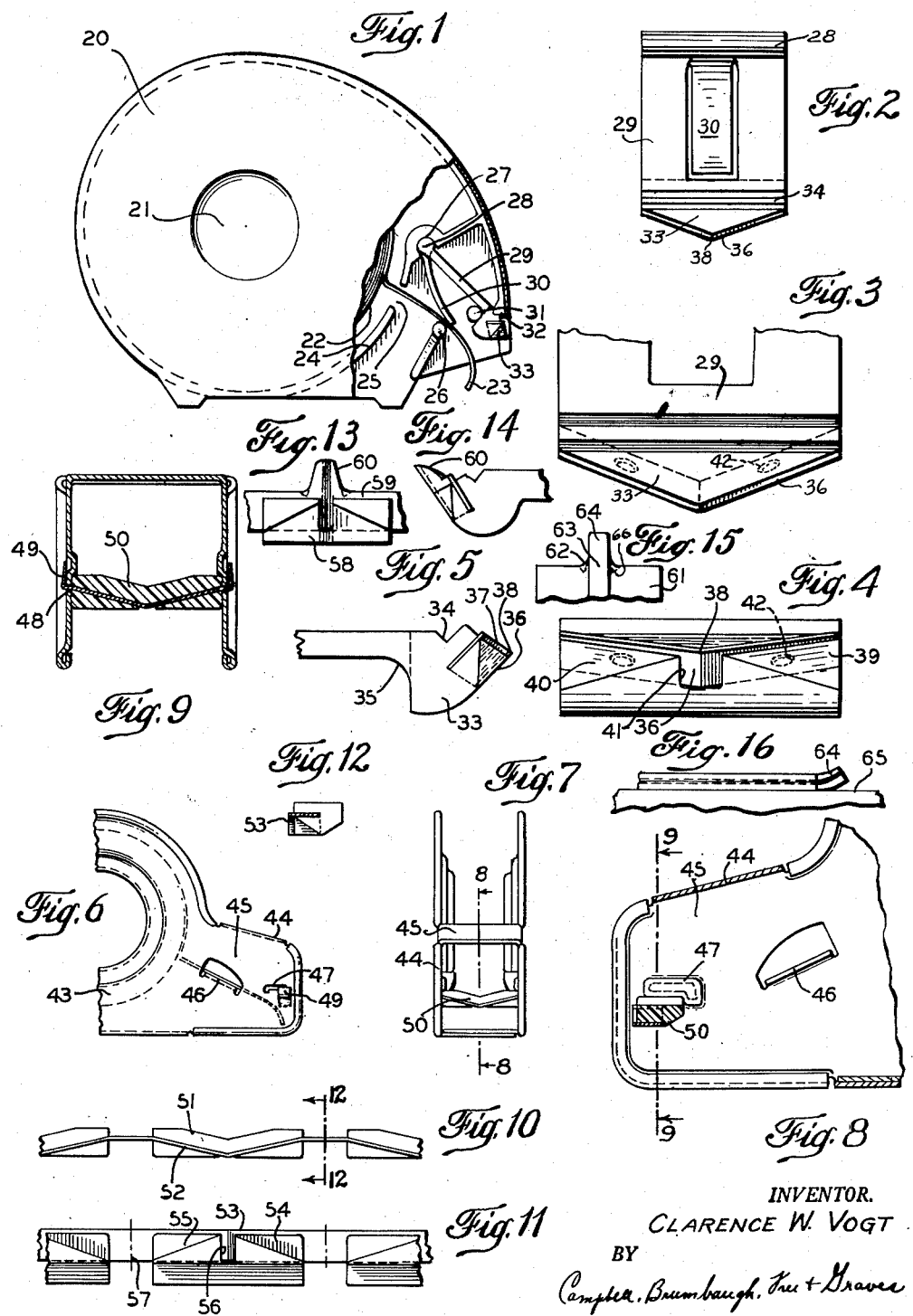
INVENTOR.
CLARENCE W. VOGT
BY
Campbell, Brumbaugh, Free + Graves
ATTORNEYS.

United States Patent Office 2,793,694
Patented May 28, 1957

2,793,694

TAPE CUTTING HEAD AND HOLDER

Clarence W. Vogt, Norwalk, Conn.

Application December 23, 1953, Serial No. 400,017

4 Claims. (Cl. 164—84.5)

This invention relates to devices for cutting adhesive tapes and, more particularly, to devices of the character illustrated in my co-pending applications Serial Nos. 372,957, now abandoned and 396,144, filed August 7, 1953, and December 4, 1953, respectively, wherein there is provided a device for holding a roll of adhesive tape and permitting the tape to be dispensed and/or applied to desired surfaces, following which the tape is severed at a desired point.

It is with respect to the means for cutting the tape that this invention is concerned and an object thereof is to provide an improved device for holding rolls of adhesive tape in order that desired lengths thereof may be dispensed, as well as to provide means for severing the tape after such lengths have been removed from the roll.

A further object of the invention is to provide, as an article of manufacture, a unitary cutting element which is adapted for use in devices as above described, as well as for convenient use in various forms of devices wherein the severing of lengths of tape is to be facilitated.

Yet another object of the invention is to provide, as an article of manufacture, a plurality of connected tape cutting units, all of which are adapted to be readily secured to tape holding devices after separating them when and as desired from the remaining group of connected units.

Yet another object of the invention is to provide, as a unitary element, an improved form of cutter head wherein the cutting element is formed of a relatively fragile or weak member supported in such fashion as to provide desired strength and rigidity, as well as to facilitate the cutting of the tape in a desired manner.

A further object of the invention is to provide an improved form of tape cutting mechanism by means of which desired cut profiles may be formed on compound tapes when the latter are severed. For the purpose of the present description, a compound tape may be defined as a tape having two or more layers or portions, at least one layer or portion of which is non-adhesive in order to facilitate the stripping or removal of the adhesive tape from a surface to which it has been previously applied. These tapes are of advantage in packages such, for example, as cigarettes and the like where a plastic wrapping is to be removed readily by tearing the plastic upon pulling of the "zip" tape.

Yet another object of the invention is to provide a tape cutting or severing mechanism which is formed in such fashion as to perform a piercing cut, that is, the tape is initially cut, by the cutting member, at a point intermediate the edges thereof.

Other and further objects of the invention will appear as it is described in further detail in connection with the accompanying drawings, wherein:

Fig. 1 is a view in side elevation, somewhat enlarged and partly broken away, showing one form of tape mounting and dispensing mechanism in which the cutting mechanism of the present invention has been embodied;

Fig. 2 is a plan view, somewhat enlarged, of the cutting mechanism of Fig. 1;

Fig. 3 is an enlarged fragmental view similar to the lower portion of Fig. 2 showing the cutting mechanism in greater detail;

Fig. 4 is a view in end elevation of the structure of Fig. 3;

Fig. 5 is a view in side elevation of the structure of Fig. 3;

Fig. 6 is a view similar to Fig. 1 showing a modified form of cutting mechanism constructed in accordance with the present invention;

Fig. 7 is a view in front elevation showing the elements of Fig. 6;

Fig. 8 is an enlarged view, taken from the right-hand side of Fig. 7, showing the elements of Fig. 7;

Fig. 9 is a view in section, taken on the plane indicated by the line 9—9 of Fig. 8, and looking in the direction of the arrows;

Fig. 10 is a view in front elevation, showing a multiplicity of cutting elements secured together in the form of an article of commerce and illustrating the manner in which the cutting elements may be manufactured and sold;

Fig. 11 is a bottom view of the structure of Fig. 10;

Fig. 12 is a view in section, taken on the line 12—12 of Fig. 10, and looking in the direction of the arrows;

Fig. 13 is a view similar to Fig. 3, showing a modified form of cutter head for use in cutting compound tapes;

Fig. 14 is a view in side elevation of the structure of Fig. 13;

Fig. 15 is a plan view of a compound tape, one end of which has been severed by the cutting mechanism of Fig. 13; and Fig. 16 is a view in side elevation, showing the tape of Fig. 15 in the position which it assumes when it has been applied to a suitable surface.

Referring to the structure shown in Figs. 1 to 5, inclusive, a tape holder and dispenser is shown at 20 as being formed with a central portion 21 adapted to position the core of a roll of adhesive tape indicated generally at 22. The free end of the tape is shown at 23 as being drawn outwardly of the casing 20 and as readily available for application to a desired surface. The casing is formed with a peripheral wall 24 having an opening 25 through which the tape is drawn when it is initially inserted within the casing and through which the tape is dispensed as it is used. The casing is also formed with a stationary snubbing surface 26 against which the adhesive surface of the tape is pressed during periods of non-use.

In order that the tape may be dispensed and maintained in the desired position, the peripheral wall of the casing is formed with a notched recess 27 within which the boss 28 of a cutter assembly 29 is received. The cutter assembly includes, as an integral portion thereof, a snubber tongue 30 which bears yieldingly against the snubbing surface 26 and thus presses the free end of the tape 23 against such surface in order to prevent the accidental displacement of the free end and thus to maintain the free end of the tape in the position illustrated in Fig. 1 in order that it may be conveniently available when the tape is to be dispensed from the holder.

The casing 20 is also formed with a positioning pin 31 and spaced positioning lug 32 in order to secure the cutting head 33 in the operating position as illustrated in Fig. 1. It will be observed that the snubber tongue 30 normally lies across the path of movement of the tape when it is drawn through the aperture 25 and across the lower surface of the cutting head 33. This insures that, upon severing of the free end of the tape, that end will be urged into its snubbed position illustrated in Fig. 1.

The cutting head 33 of the cutter assembly 29 is formed as an enlargement having a transverse groove 34 which is adapted to engage the boss 32, this groove being spaced from a curved neck portion 35 a distance equal to the space between the pin 31 and boss 32. The cutting head 33 is molded about a relatively thin and flexible cutting element 36 that preferably is in the form of a V-shaped metallic strip, as illustrated in Figs. 2, 3 and 4. The cutting edge 37 of the element 36 projects outwardly beyond the adjacent surfaces of the cutting head 33 in order that it may present an effective cutting surface to the tape. It will be observed that the apex 38 of the cutting edge 37 is the first portion of the cutting element that is presented to the tape and that this portion is presented to the tape intermediate the side edges thereof. As a result, the cutting operation involves a piercing cut that first punctures or pierces the tape and then completes the cut by progressively severing the tape portions toward the marginal edges of the tape.

In order that a substantially straight transverse cut may be performed upon the tape, the molded cutting head 33 is formed with tapering lands 39 and 40 that widen outwardly as they progress toward the side edges of the cutting head. The head may be formed with a notched portion 41 within which the apex or central portion 38 of the cutting element is received in order that, at the central portion of the head, the cutting element is fully exposed. This structure avoids the necessity of providing extremely thin molded portions in this region.

Dimples or the like 42 may be formed in the cutting element 36 to facilitate the securing of the same within the molded cutting head, and it is preferred that a greater expanse of the cutting element be exposed on the side of the cutting element adjacent the lands 39 and 40 than upon the opposite side thereof, which latter side is the back-up side and is adjacent to the inactive edge of the cutting element. It will be seen that this structure affords an effective backing up of the relatively thin and flexible cutting element 36 and thus provides a strong and effective cutting structure without requiring a substantial mass of cutting element.

Turning to the structure shown in Figs. 6 to 9, inclusive, a tape holder is shown at 43 as being formed of spaced plates of suitable material, such as metal or the like, connected by a forward bridge 44 having side walls 45. Snubbing ears 46 are pressed out of the material of the side walls 45 and serve as a means for preventing return movement of the tape, as illustrated in Fig. 6. Adjacent the outer end of the holder, detents 47 are formed out of the material of the side walls 45, and apertures 48 are formed in the side walls in order that the extremities 49 of the cutting element 36 may extend therethrough and be upset, as illustrated in Fig. 9, in order to secure a cutting head 50 in the position illustrated in Figs. 6 to 9.

The material of the cutting head is illustrated in Figs. 10 to 12 and will be seen to include a body portion 51 that may be of molded plastic or the like and within which there is secured a V-shaped cutting element 52. Whereas, in the form of cutting element illustrated in Figs. 1 to 5, inclusive, the cutting element is of a swept-back form, in the form illustrated in Figs. 10, 11 and 12, the cutting element is formed as a straight V. In other words, the cutting edge 53 of the cutting element 52 is formed to lie in a single plane that is transverse to the bottom of the V-shaped cutting element. This form will be readily apparent from an inspection of Figs. 10 to 12.

As with the cutter head 33 in Fig. 4, the cutting elements 52 are formed with sloping lands 54 and 55 and with notches 56 that correspond to the notches 41 in Fig. 4.

In forming the cutting heads 50 of Figs. 6 to 12, inclusive, as articles of manufacture, they are preferably manufactured in units, each of which units includes a plurality of cutting elements, as illustrated in Figs. 10 and 11. The lines of severance between the heads are indicated at 57 in order that they may be separated and inserted within the holder illustrated in Figs. 6 to 9. It is to be understood, of course, that the form of cutter head shown in Figs. 1 to 5 may be used in the device shown in Figs. 6 to 12, if desired.

As a further and important aspect of the present invention, the cutting element of the cutting head may be formed as illustrated in Figs. 13 and 14. There the cutter head 58 is provided with a cutting element 59 having a protuberance 60 formed therein, this element being received within the molded head 58, the structure of which may conform to any of those previously described in Figs. 1 to 12 inclusive. This form of cutter head will produce a severed profile on a tape 61 as illustrated at 62 in Fig. 15. The tape 61 is a compound tape, such tape being defined, for the purpose of the present description, as tape having an intermediate portion that is non-adhesive. These tapes may be of various forms, for example of the form in which a non-adhesive tear or pull strip 63 is applied to the adhesive surface of the tape 61 intermediate the sides thereof so that the protuberance 64 that is formed by the cutter head 58 will form a tab that does not adhere to the surface 65 to which the tape has been applied. This is illustrated in Fig. 16 wherein it is seen that the tab or protuberance 64 may be easily lifted from the surface 65 in order to strip the tape from such surface. Articles such as bags and the like may be sealed by these tapes in such fashion as to permit the ready removal of the sealing strip.

Where the tape is of easily rupturable material, for example cellophane of sufficient thinness, the pull strip 63 may be used to tear apart the two opposite sides of the tape 61, assuming, for example, sufficient strength in the pull strip 63. To facilitate this, the cut formed across the tape may be provided with notches 66 on either side of the tape 61, these notches serving to start the tear longitudinally of the tape as the pull strip 63 is lifted or torn back. Where the pull strip 63 is to be used merely to remove the tape 61 from the surface to which it has been applied in order that it may be re-applied, the material of the tape is made stronger and in accordance with common practice. For example, acetate fiber tape will serve to permit the tape to be used as a re-closure when it is to be re-applied to a desired surface such, for example, as in applications where the tape is used to seal bags, containers and the like.

While the invention has been described with reference to the various structures illustrated in the accompanying drawings, it is not to be limited, save as defined in the appended claims.

I claim:

1. As an article of manufacture, a tape cutter comprising a body portion having a reentrant portion, a cutter head having a cutter thereon mounted in said reentrant portion, means on said body portion to secure the cutter head in a desired position, a flexible tongue secured to the cutter head adjacent the last-named means to engage adhesive tape advancing to the cutting head, and a snubber element on said body portion to engage the side of the tape opposite from said tongue to press the tape between them, said cutter comprising a strip of metal having a cutting edge at one end thereof and being bent to a substantially V-shape on a line extending transversely of said strip about midway between its ends, the major portion of the cutting edge being straight before bending.

2. A tape dispensing device comprising a cutting element formed of a relatively thin, narrow strip of metal having one edge sharpened to form a cutting edge, said edge being initially straight throughout the major portion of its length, said strip being bent on a line extending transversely thereof midway between its ends to render it V-shaped, a cutter support member formed around the cutting element to support and reinforce said cutting element and leaving its cutting edge exposed, a holder for a roll of tape, snubbing means on said holder to maintain tension on said tape as it is being dispensed, means supporting said cutter support adjacent to said snubbing means with said cutting element in position to be engaged by said tape, said cutting edges being disposed in a plane substantially normal to said tape when the latter is pulled against the cutting edge to sever the tape, the midportion of the cutter engaging the tape first to puncture and then sever the tape in a substantially straight line transversely of the tape.

3. A cutter for tape dispensing devices comprising a cutting blade formed of a relatively thin, narrow strip of metal having one edge sharpened to form a cutting edge, said edge being initially straight throughout the major portion of its length, said strip being bent on a line extending transversely thereof midway between its ends to render it V-shaped and form a piercing point at the junction of said line with said sharpened edge, a cutter support member formed around the blade behind said cutting edge, said support member having tapering lands on a surface thereof disposed in planes spaced behind and substantially parallel with said cutting edge, said lands decreasing in thickness inwardly from adjacent to the ends of the blade and terminating on opposite sides of said line and piercing point to expose said piercing point, the portion of the blade adjacent to and behind said piercing point and said cutting edge and covering and stiffening the remainder of said blade.

4. An article of manufacture according to claim 3 wherein a tape piercing portion is formed on the cutting element intermediate the ends thereof and projects outwardly beyond the plane of said major portion of said cutting edge.

References Cited in the file of this patent

UNITED STATES PATENTS

| | | |
|---|---|---|
| 126,673 | Busell | May 14, 1872 |
| 455,015 | Gilliland | June 30, 1891 |
| 678,002 | Miller | July 9, 1901 |
| 799,449 | Clemons | Sept. 12, 1905 |
| 875,067 | Green | Dec. 31, 1907 |
| 1,463,393 | Heilman | July 31, 1923 |
| 2,324,204 | Fischer | July 13, 1943 |
| 2,400,435 | Nelson et al. | May 14, 1946 |